United States Patent [19]

Wachholz et al.

[11] Patent Number: 4,759,901

[45] Date of Patent: Jul. 26, 1988

[54] NUCLEAR REACTOR INSTALLATION ARRANGED IN THE CAVITY OF A PRESSURE VESSEL

[75] Inventors: Windried Wachholz, Gorxheimertal; Ulrich Weicht, Weinheim, both of Fed. Rep. of Germany

[73] Assignee: Hochtemperatur-Reaktorbau GmbH, Fed. Rep. of Germany

[21] Appl. No.: 752,544

[22] Filed: Jul. 8, 1985

[30] Foreign Application Priority Data

Jul. 7, 1984 [DE] Fed. Rep. of Germany ....... 3425144

[51] Int. Cl.⁴ ............................................. G21C 15/18
[52] U.S. Cl. ................................ 376/299; 165/104.14; 165/911; 376/367
[58] Field of Search ....................... 376/298, 299, 367; 165/104.14, 911

[56] References Cited

U.S. PATENT DOCUMENTS

| | | | |
|---|---|---|---|
| 2,810,689 | 10/1957 | Wigner et al. | 376/298 |
| 3,047,485 | 7/1962 | Ellis | 376/299 |
| 3,190,808 | 6/1965 | Dodd | 165/911 |
| 3,302,042 | 1/1967 | Grover et al. | 376/367 |
| 3,403,075 | 9/1968 | Fiebelmann | 376/367 |
| 3,668,070 | 6/1972 | Fiebelmann et al. | 376/367 |
| 3,866,424 | 2/1975 | Busey | 376/298 |
| 4,299,271 | 11/1981 | Mills et al. | 165/911 |
| 4,487,742 | 12/1984 | Bret | 376/367 |
| 4,526,742 | 7/1985 | Hannerz | 376/298 |
| 4,537,247 | 8/1985 | Okamoto et al. | 165/104.14 |
| 4,560,533 | 12/1985 | Huebotter et al. | 376/367 |

FOREIGN PATENT DOCUMENTS

| | | | |
|---|---|---|---|
| 0141237 | 5/1985 | European Pat. Off. | 376/298 |
| 3141734 | 4/1983 | Fed. Rep. of Germany. | |
| 3344527 | 11/1983 | Fed. Rep. of Germany. | |
| 3226300 | 1/1984 | Fed. Rep. of Germany. | |
| 1026474 | 4/1966 | United Kingdom | 376/299 |

OTHER PUBLICATIONS

Ando, "Application of Heat Pipes to Nuclear Steel Making, " Nuclear Engineering International, Jun. 1976.

*Primary Examiner*—Deborah L. Kyle
*Assistant Examiner*—Richard W. Wendtland
*Attorney, Agent, or Firm*—Robert J. Koch

[57] ABSTRACT

A nuclear reactor installation located in the cavity of a pressure vessel comprises a nuclear reactor with a core traversed from top to bottom by a cooling gas, a plurality of main loops consisting of heat exchangers and blowers, together with auxiliary loops for the removal of decay heat. According to the invention, the auxiliary loops contain no heat exchangers but a bundle of heat pipes independent of each other, the heat absorbing part of which is arranged in the pressure vessel cavity. As a heat sink, an external cooling water loop is provided for each bundle of heat pipes in which water is circulated. The cooling water is recooled in a cooling tower. In a preferred embodiment the heat transferring part of the heat pipes of each bundle terminates in an external water reservoir to which the cooling water loop is connected. For a certain period of time, in case of a sufficient volume of water, the decay heat may be removed only by evaporation from the water reservoir.

4 Claims, 2 Drawing Sheets

NUCLEAR REACTOR INSTALLATION ARRANGED IN THE CAVITY OF A PRESSURE VESSEL

BACKGROUND OF THE INVENTION

1. Field of the Invention

The invention relates to a nuclear reactor installation arranged in the cavity of a pressure vessel, with a nuclear reactor, the core, surrounded by a thermal side shield, which is being traversed from top to bottom by a cooling gas, with a plurality of main loops, each containing within the pressure vessel a heat exchanger and a blower, together with two gas conduits to connect the said components with the reactor core, and with a plurality of auxiliary loops for the removal of decay heat, wherein each auxiliary loop is connected by means of two gas conduits with the reactor core.

In nuclear reactor installations, rapid shutdowns (insertion of absorber rods) are followed in the core by the development of decay heat, which initially amounts to approximately 4% of the nominal thermal capacity. This decay heat development declines rapidly at first and then slower and in its later variation approaches a value of zero asymptotically. In order to prevent an excessive rise in temperature in the reactor core, the decay heat must be removed from the core.

2. Description of the Prior Art

It is part of the state of the art to equip nuclear reactor installations of higher capacities with auxiliary loops for the removal of decay heat, each of which contains auxiliary heat exchangers and auxiliary blowers. The auxiliary heat exchangers are connected by means of gas conduits with the hot gas and cold gas collector spaces of the reactor. During normal operation, the auxiliary heat exchangers are closed, for example by gravity actuated butterfly valves on the auxiliary blowers, which causes a slight backflow of cold gas over the auxiliary heat exchangers. No hot gas can therefore pass by free convection in the auxiliary heat exchangers.

In high temperature reactors at least two auxiliary loops are provided for the removal of decay heat; they may be operated independently of each other and independently of the main loops. Because these systems are important from the standpoint of safety engineering, there are very high requirements concerning their operating availability and safety. In German Offenlegungsschrift No. 31 41 734 and 32 26 300, and in German P No. 33 44 527.3 high temperature reactors equipped with such auxiliary loops are described.

Every installation for the removal of decay heat comprises: (1) an intermediate cooling water loop, wherein by means of a circulating pump, water is circulated through the auxiliary heat exchangers; (2) an intermediate cooler, in which the water transfers its heat to a service cooling water loop; and (3) the auxiliary loops with the auxiliary heat exchangers and the auxiliary blowers for the cooling gas. In the intermediate cooling water loop, a further circulating pump and a cooling tower are arranged. The intermediate cooler, the circulating pumps and the service cooling water loops are located outside the reactor pressure vessel.

One disadvantage of the known decay heat removal installations is that it is composed of several active components, such as pumps. A second disadvantage is if a tube fractures in the auxiliary water exchangers, which must be anticipated, a large volume of water (up to several m³) may enter the reactor core. Furthermore, the auxiliary heat exchanger involved in no longer available for the removal of decay heat because it must be shut off as soon as possible.

SUMMARY OF THE INVENTION

In view of the above described state of the art, it is the object of the invention to develop a nuclear reactor installation of the above described structural type so that the disadvantages of the known decay heat removal facilities may be avoided.

According to the invention, this object is attained in that each auxiliary loop comprises a bundle of independent, parallel heat pipes, together with a cooling gas blower, with the heat absorbing part of the heat pipes being arranged in an interruptable flow of cooling, and by an external cooling water system operated by means of a circulating pump which is provided as a heat sink for each bundle of heat pipes, with a cooling tower being located in a known manner in each loop.

Compared to the known nuclear reactor installations, the plant according to the invention has the advantage that the installations for the removal of decay heat have a high degree of availability. First, if a tube fractures, which must be anticipated, only a limited, small amount of water may enter the reactor core. Thus, an additional expensive leakage monitoring system becomes superflous. Second, if there is a leak in a bundle of heat pipes, this would affect only one heat pipe and therefore, the removal of the decay heat is not affected because a bundle consisting of independent individual heat pipes provides a high degree of redundancy. In contrast, in case of a leak in a heat exchanger, the entire auxiliary loop is affected.

The high availability of the decay heat removing installations is further enhanced by the fact that they are capable of operating with few active components, such as circulating pumps, since one cooling water loop per installation has been eliminated.

The heat transmitting part of the heat pipes of each bundle terminates preferably in a reservoir filled with water, located above the pressure vessel, to which the cooling water system involved is connected.

According to an advantageous further development of the invention, the reservoirs are equipped with at least one evaporator line for the water and are sufficiently large enough to be capable of removing the decay heat by evaporation for a certain period of time in case of a failure of the external active cooling water loop. In an emergency therefore the removal of the decay heat is possible without the use of active components.

If in the nuclear reactor installation, the heat exchangers of the main loops are located in an annular space formed by the wall of the cavity and the thermal side shield, it is advantageous to arrange the heat absorbing part of the heat pipes also in this annular space. The part of the heat pipes, which transports the heat absorbed to the heat transfer part, is installed in bundles in a vertical passage located in the roof of the pressure vessel.

BRIEF DESCRIPTION OF THE DRAWINGS

The invention shall be explained in more detail by means of an example of embodiment. The figures show in schematic views.

DETAILED DESCRIPTION OF THE PREFERRED EMBODIMENT

Figure 1:
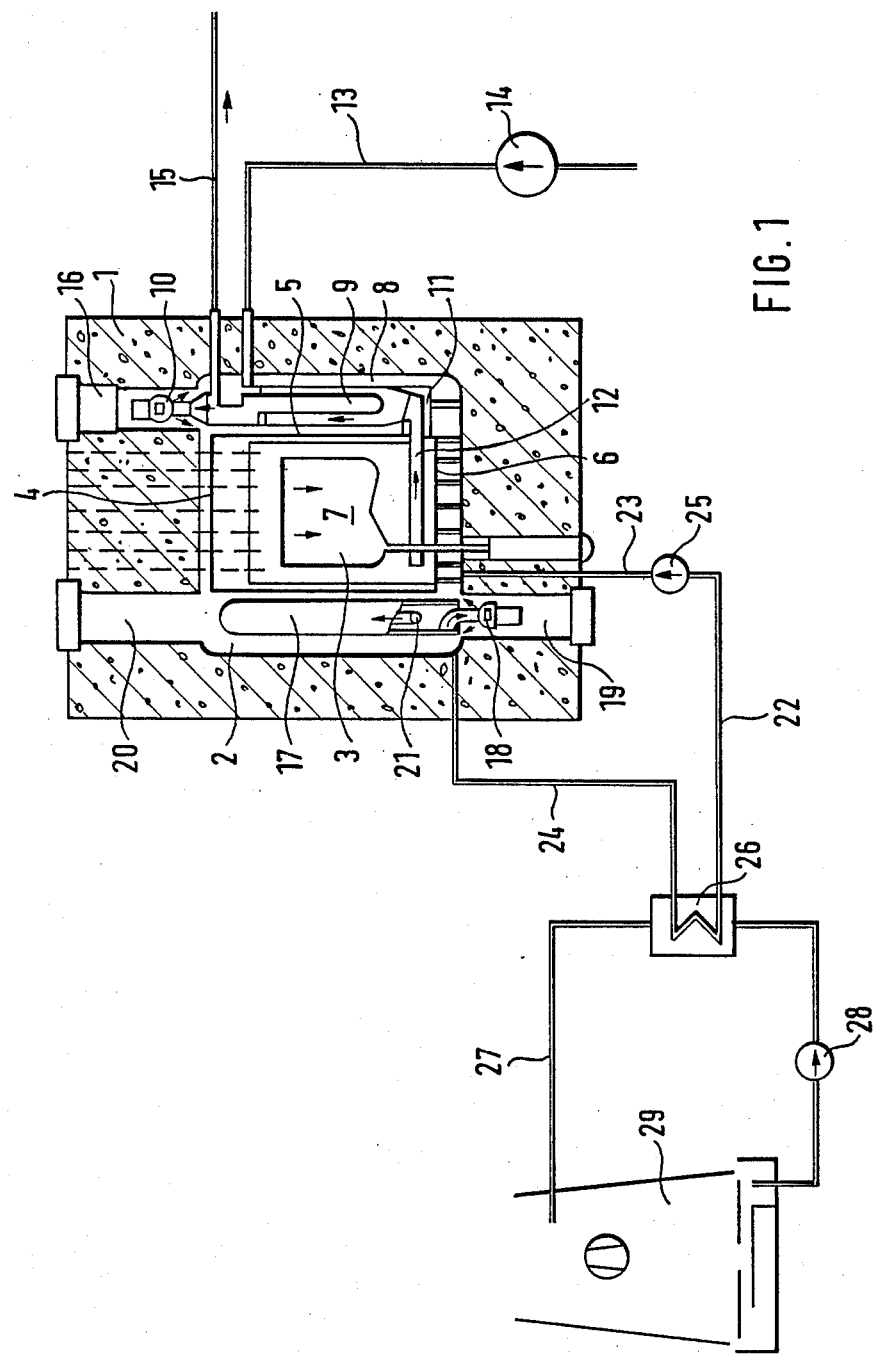
FIG. 1 shows a nuclear reactor installation in a longitudinal section with a high temperature reactor and a decay heat removal installation in the configuration customary heretofore.

FIG. 1 shows a prestressed concrete pressure vessel 1 with a center cavity 2. In the cavity 2 a high temperature reactor 3, surrounded by a thermal roof shield 4, a thermal side shield 5, and a thermal bottom shield 6, is installed, together with a pile 7 of spherical fuel elements. The pile 7 is traversed from top to bottom by a cooling gas.

The wall of the cavity 2 and the thermal side shield 5 border an annular space 8, in which—distributed uniformly around the high temperature reactor 3—for example eight heat exchangers 9 are provided, with a blower 10 being associated with each of them. The heat exchangers 9, only one of which is shown, are connected by means of a hot gas conduit 11 with a hot gas collector space 12 located under the pile 7. Each of the heat exchangers 9 is connected by means of a feed water line 13 with a feed water pump 14, while the steam generated is removed through a live steam line 15, each from the heat exchangers 9. The associated blowers 10 are installed in a vertical passage 16 each in the roof of the prestressed concrete pressure vessel 1.

In addition to the eight main loops comprising heat exchangers 9 and a blower 10, the nuclear reactor installation comprises two auxiliary loops for the removal of decay heat. Each of the latter contains an auxiliary heat exchanger 17 and an auxiliary blower 18. While the auxiliary heat exchangers 17 are located between the heat exchangers 9 in the annular space 8, the auxiliary blowers 18 are arranged in a vertical passage 19 each in the bottom of the prestressed concrete pressure vessel 1. The auxiliary blowers are equipped with butterfly valves (not shown). For the installation and removal of the auxiliary heat exchangers 17, vertical passages 20 are again provided above them, in the roof of the prestressed concrete pressure vessel 1. By means of a hot gas conduit 21, each auxiliary heat exchanger is connected with the hot gas collector space 12. Only one of the two auxiliary loops is shown.

As seen in FIG. 1, each of the auxiliary heat exchangers 17 is connected with an intermediate cooling water loop 22, by means of the lines 23 and 24. Each of the intermediate water loops further contains a circulating pump 25 and an intermediate cooler 26; in the latter the water circulated in the loop 22 transfers its heat to a second loop, the service water cooling loop 27. Each service water cooling loop 27 contains a circulating pump 28 and a wet cooling tower 29. In the latter, the heat removed from the nuclear reactor 3 is released to the environment.

Figure 2:
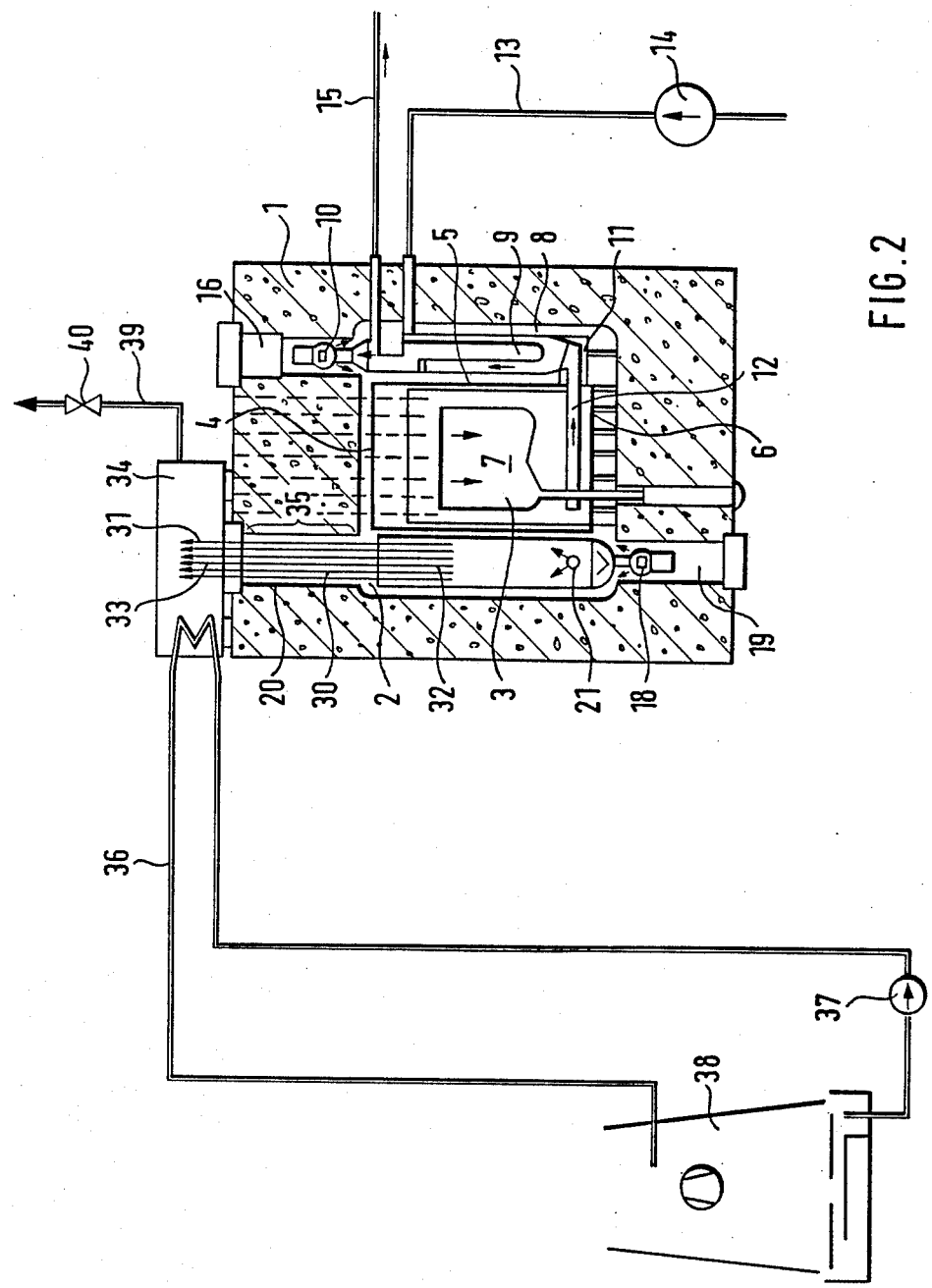
FIG. 2 shows the same nuclear reactor installation with the characteristics of the invention.

FIG. 2 shows a nuclear reactor installation, which—with the exception of the apparatus for the removal of the decay heat—corresponds to the installation of FIG. 1. Identical reference symbols are used for identical structural parts. Here again, two auxiliary loops are provided for the removal of decay heat.

In place of the auxiliary heat exchangers 17, each auxiliary loop contains a bundle 30 of parallel and independent heat pipes, the heat absorbing part 32 of which is arranged in a flow of cooling gas that may be interrupted by means of the butterfly valve of the auxiliary blower 18 involved. The heat emitting part 33 of the heat pipes 31 of each bundle is installed in a reservoir 34 filled with water and placed on top of the prestressed concrete pressure vessel 1. The part 35 transporting the heat, i.e., the connecting part between the parts 33 and 34, is located in each bundle 30 in one of the vertical passages 20.

As a heat sink, an external cooling water system 36 is provided for each bundle 30 of heat pipes, in which by means of a circulating pump 37, cooling water is circulated and which is connected with the reservoir 34. For the recooling of the circulating water, the cooling water system 36 is equipped with a wet cooling tower 38.

At least one evaporator line 39 is issuing from each reservoir 34; it is equipped with a safety valve 40. If there is a sufficiently large water supply in the reservoirs 34, the decay heat may be removed by evaporation for a certain period of time through the lines 39 in case of a failure of the active cooling water system. It is thus possible to remove the decay heat even without active components, such as the circulating pumps 37.

We claim:

1. A nuclear reactor installation located in the cavity of a pressure vessel equipped with a vessel roof and a nuclear reactor contained in said vessel, a core contained within the reactor is traversed from top to bottom by a cooling gas and is surrounded by a thermal side shield, within the pressure vessel is a plurality of main loops each containing a heat exchanger, a blower and two gas conducting conduits connecting the heat exchanger pipe and the blower with the reactor core, several auxiliary loops connected by means of two gas conducting conduits with the reactor core for removal of decay heat, such as is generated by a rapid insertion of control rods into the core, each auxiliary loop comprising:

bundled heat pipes made up of a plurality of independent, parallel heat pipes each with a heat absorbing part located within the pressure vessel and a heat emitting part located outside the pressure vessel;

means for blowing cooling gas, causing the gas to flow, associated with said heat pipes;

means for interrupting the flow of cooling gas associated with said means for blowing;

a heat sink associated with the heat emitting part of the heat pipes of each bundle;

an external cooling loop associated with each heat sink;

each cooling loop serially including a circulating pump and a cooling tower;

wherein the heat emitting part of the heat pipes of each bundle terminates in a reservoir located above the pressure vessel, said reservoir being said heat sink, being filled with water and being connected to said external cooling loop.

2. A nuclear reactor installation as in claim 1, wherein the bundled heat pipes are located in an annular space formed by the wall of the cavity and the thermal side shield, and wherein the heat absorbing parts of the heat pipes in a bundle are also arranged in the annular space; each heat pipe further comprises a center part connecting said heat emitting part and said heat absorbing part, serving to transport heat, said center part being installed in a vertical passage through the roof of said pressure vessel.

3. A nuclear reactor installation as in claim 1 further comprising:

at least one evaporator line exiting from each reservoir;

and a safety valve connected to each evaporator line.

4. A nuclear reactor installation as in claim 1, wherein the bundled heat pipes are located in an annular space formed by the wall of the cavity and the thermal side shield, and wherein the heat absorbing parts of heat pipes in a bundle are also arranged in the annular space; each heat pipe further comprises a center part connecting said heat emitting part and said heat absorbing part, serving to transport heat, said center part being installed in a vertical passage through the roof of said pressure vessel.

* * * * *